United States Patent [19]
McEwen et al.

[11] Patent Number: 5,389,256
[45] Date of Patent: Feb. 14, 1995

[54] FILTER APPARATUS FOR MACHINE TOOL COOLANT

[75] Inventors: Stephen N. McEwen, Bowling Green; Jay M. Creps, Rudolph; Scott M. McEwen, Bowling Green, all of Ohio

[73] Assignee: Henry Filters, Inc., Bowling Green, Ohio

[21] Appl. No.: 967,196

[22] Filed: Oct. 27, 1992

Related U.S. Application Data

[63] Continuation-in-part of Ser. No. 575,338, Aug. 30, 1990, Pat. No. 5,158,691.

[51] Int. Cl.$^6$ .................. B01D 33/21; B01D 33/46
[52] U.S. Cl. .................. 210/346; 210/391; 210/396; 210/402; 210/486
[58] Field of Search .............. 210/346, 391, 396, 402, 210/404, 486, 498, 345, 330, 331, 327, 334

[56] References Cited

U.S. PATENT DOCUMENTS

| | | | |
|---|---|---|---|
| 1,259,139 | 3/1918 | Salisbury | 210/331 |
| 1,540,325 | 6/1925 | Fuller | 210/498 |
| 2,165,931 | 7/1939 | Levy | 210/347 |
| 2,885,083 | 5/1959 | Peterson et al. | 210/327 |
| 3,096,278 | 7/1963 | Francom | 210/331 |
| 3,283,906 | 11/1966 | Crane et al. | 210/347 |
| 3,395,801 | 8/1968 | Müller | 210/331 |
| 4,179,378 | 12/1979 | Borre | 210/486 |
| 4,347,208 | 8/1982 | Southall | 210/331 |
| 4,637,876 | 1/1987 | Dosoudil | 210/331 |
| 4,897,192 | 1/1990 | Lawrence | 210/330 |
| 5,227,064 | 7/1993 | Strid | 210/327 |
| 5,258,120 | 11/1993 | Knodel et al. | 210/331 |

Primary Examiner—Sun Uk Kim
Attorney, Agent, or Firm—Brooks & Kushman

[57] ABSTRACT

A filter apparatus for filtering machine tool coolant is disclosed as including a drum filter or a disc filter assembly including a hollow rotatable mandrel mounting a drum filter assembly or plurality of removable hollow disc filter elements each element having a foraminous non-reticulated metal screen having minute openings and a smooth planar surface for providing improved scrape cleanability and preventing movement of machining chips, particulate and also elongate contaminants from one side of the filter to the other side thereof.

5 Claims, 7 Drawing Sheets

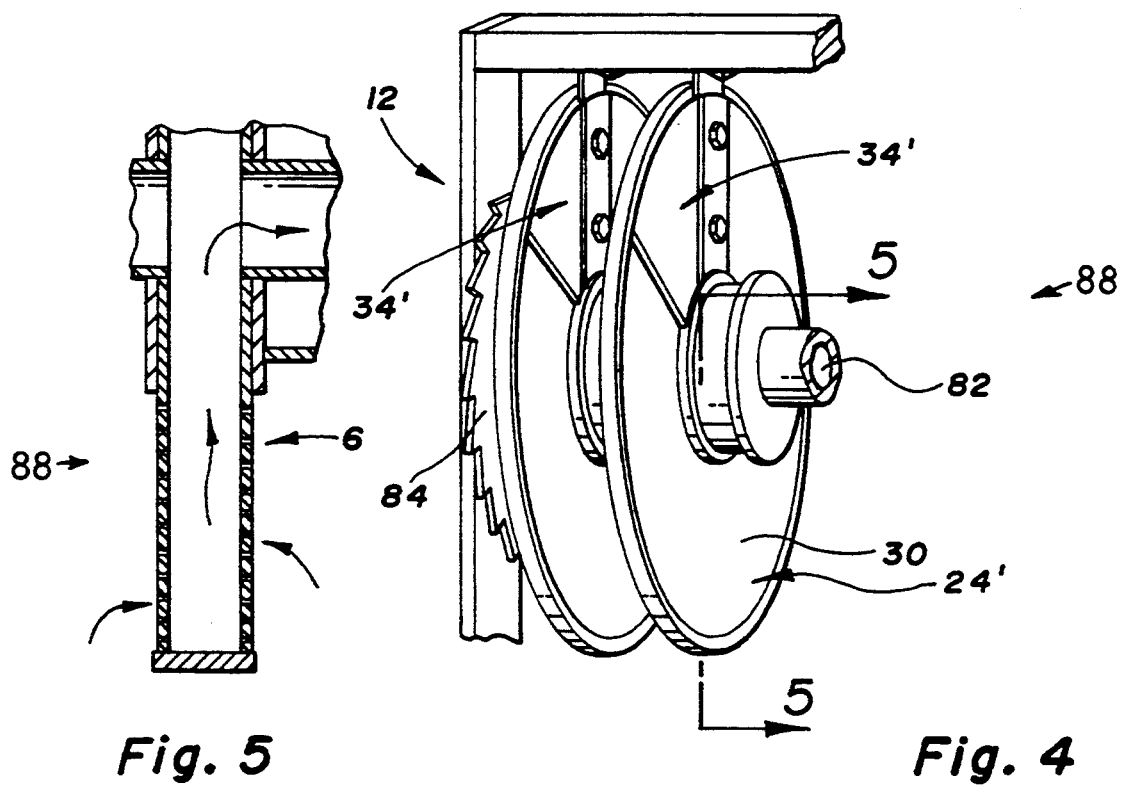
Fig. 5          Fig. 4
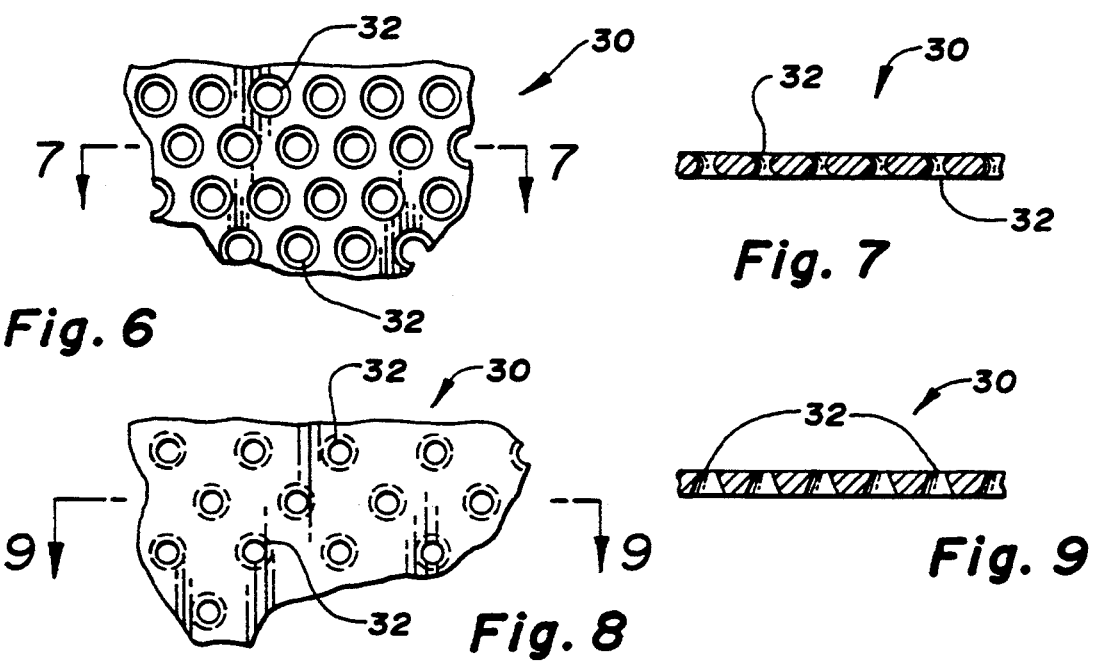
Fig. 6   Fig. 7
Fig. 8   Fig. 9

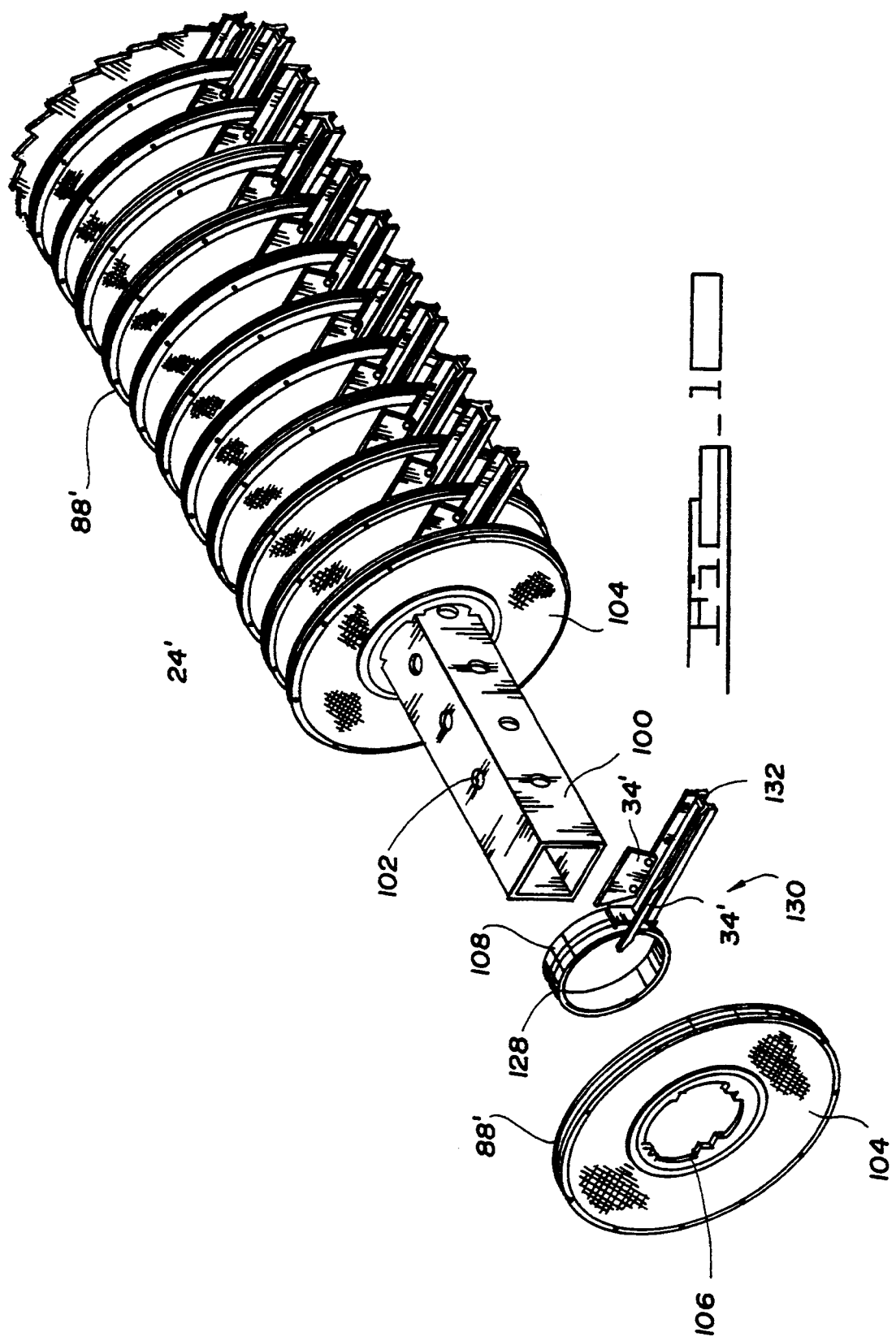

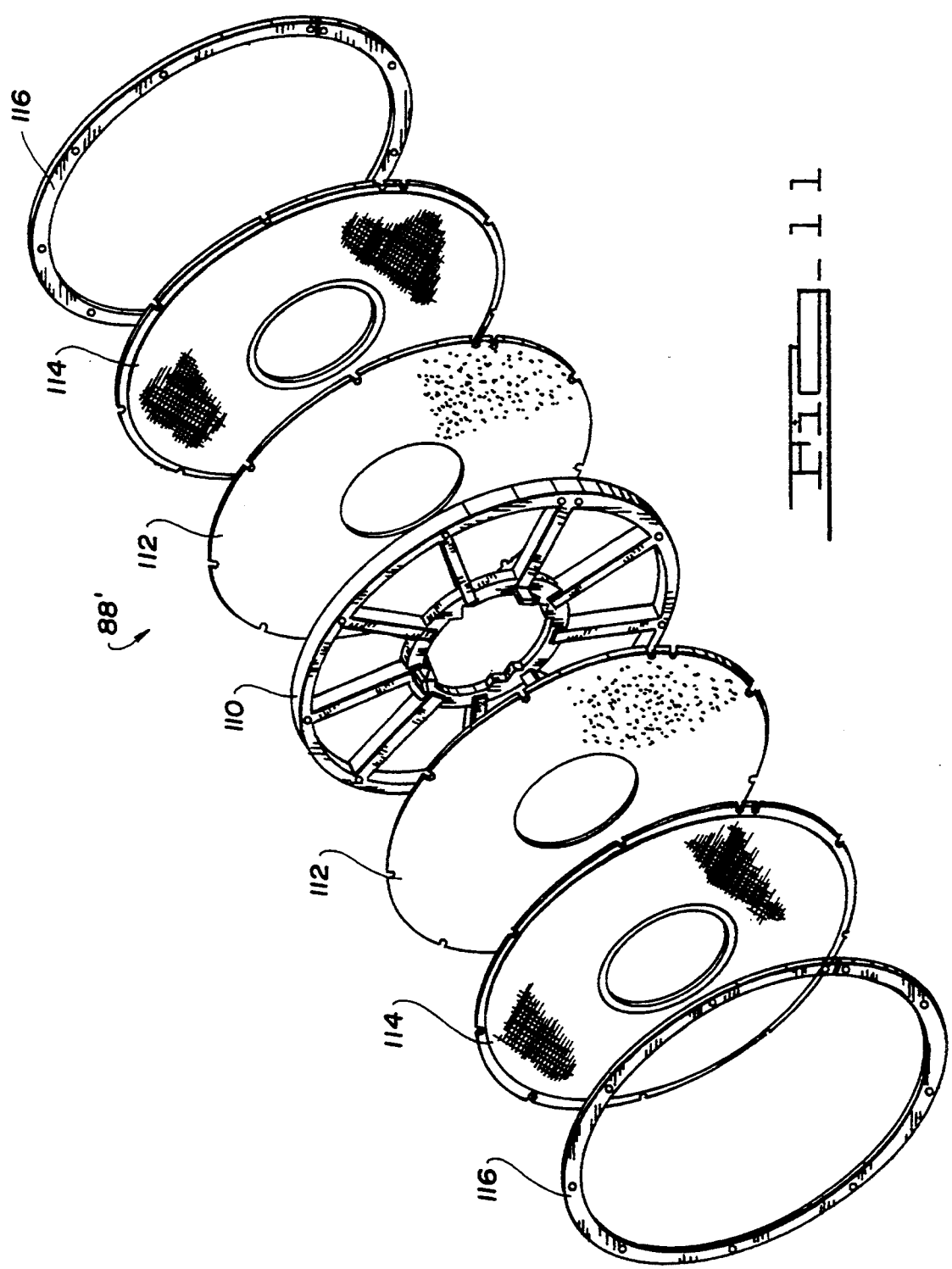

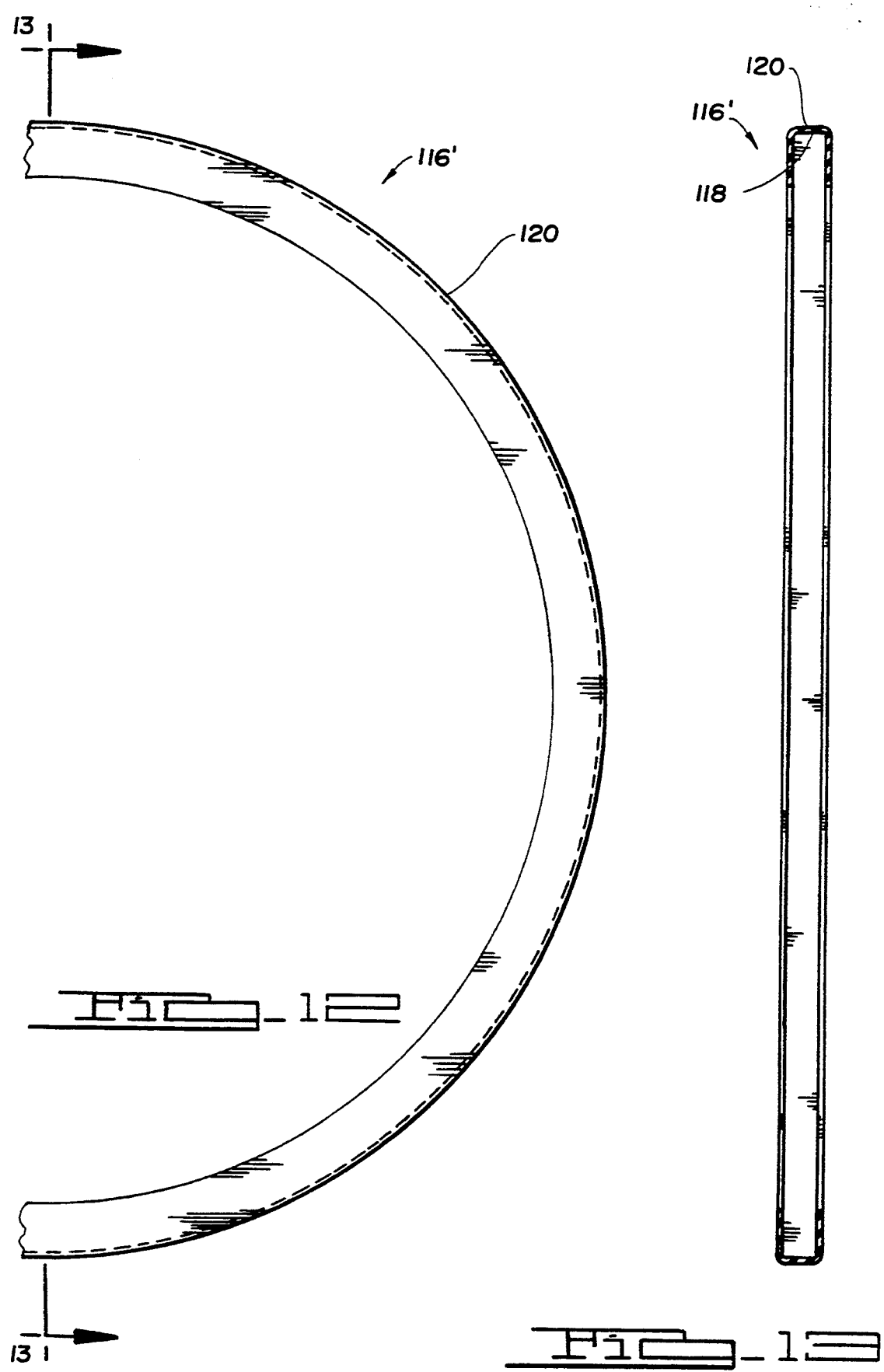

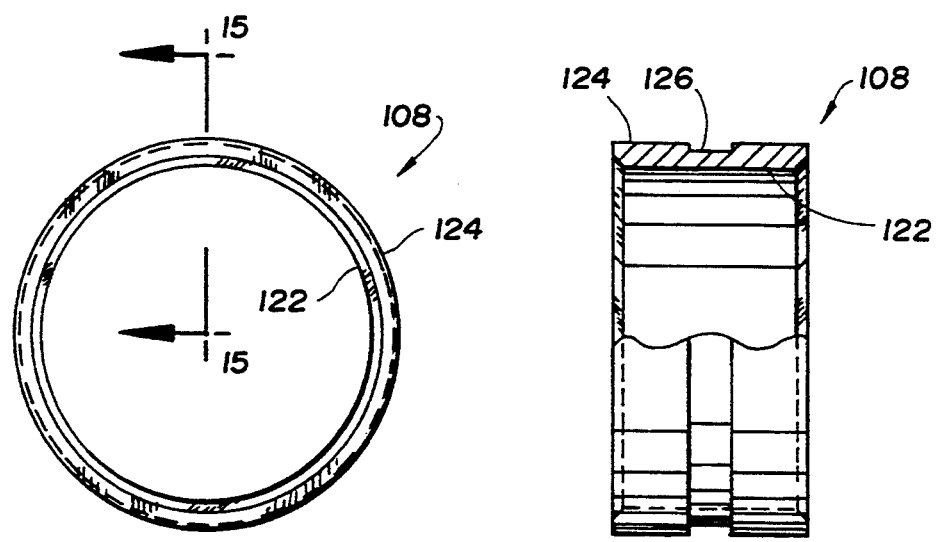
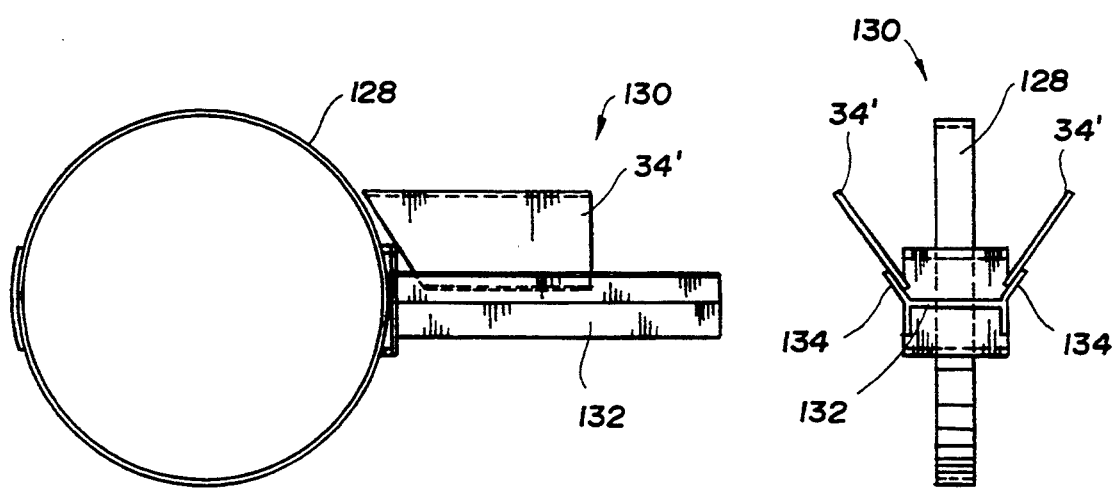

FILTER APPARATUS FOR MACHINE TOOL COOLANT

CROSS-REFERENCE TO RELATED APPLICATION

This application is a continuation-in-part of U.S. Pat. application Ser. No. 575,338, titled Filter Apparatus for Machine Tool Coolant, filed Aug. 30, 1990, now U.S. Pat. No. 5,158,691.

TECHNICAL FIELD

This invention relates to filters for filtering industrial liquids such as machine tool coolants and more particularly to an immersible drum or disc filter apparatus for filtering contaminants onto a foraminous surface.

BACKGROUND ART

Conventional filter apparatus utilized in machine tool operations of the type described in U.S. Pat. Nos. 4,507,061 and Re. 32,135 separate machine tool chips and other contaminants from coolant so that clean coolant may be returned to the machine tools for reuse. Often times, the contaminants are very small and of an elongated shape. Usually one or more horizontally disposed filter drums are located adjacent the bottom of a settlement tank. A suction is provided by a pump to the interior of the filter drum to pull coolant through the filter element to move the coolant from one side of the filter to the other. Filter cake, comprised of small chips and other contaminants, is formed on the outside of the drum surface. The drum is periodically indexed to enable a doctor blade to scrape off a portion of the accumulated filter cake, which drops to the bottom of the tank for removal by a dragout conveyor.

The conventional filter element is comprised of a continuous length of wedge shaped wire wrapped around a drum-shaped support. The filter element thereby includes elongated openings through which some elongated contaminants are allowed to pass if the contaminants are aligned in the direction of fluid movement as they strike the filter. The passage of these elongate contaminants allows the contaminants that pass through the filter to be recirculated to the machine tools.

An alternate type filter system that has been tried is fabricated from rectilinear mesh, wire cloth or the like. Although the minute square openings formed by the woven wire cloth are effective in preventing the passage of elongate contaminants, the surface is not a flat planar surface and thus becomes clogged when scrape cleaning is attempted.

DISCLOSURE OF INVENTION

An object of the present invention is to provide an improved filter apparatus for filtering industrial liquid such as machine tool coolant.

A further object of the invention is to provide an improved filter apparatus having a filter that provides improved scrape-cleanability of the filter surface.

A still further object of the invention is to provide a filter element that prevents movement of machining chips, particulate and also elongate contaminants found in machine tool coolant from one side of the filter to the other side.

Another object of the invention is to provide an improved disc filter assembly that is easy to assemble and disassemble for repair and maintenance.

In carrying out the above objects and other objects of the invention, the filter apparatus includes a horizontally rotatable cylindrical drum filter in a settlement tank having a dragout conveyor. The settlement tank contains industrial liquids such as machine tool coolant or the like containing machining chips. These chips are found in a wide spectrum of particle sizes and shapes, including elongate contaminants. A circulating pump creates suction on one end of the filter assembly. The drum filter has a foraminous surface comprised of a non-reticulated metal screen having minute openings and having a smooth planar surface. A doctor means is provided for scraping the foraminous surface to remove deposited contaminants. The minute openings in the foraminous surface are generally in the range of between 50 and 250 microns and provide improved scrape cleanability to the surface while preventing movement of machining chips (particulate including elongate contaminants) from one side of the filter to the other side.

In a preferred embodiment of the invention, minute openings are generally 120 microns. In one arrangement of the preferred embodiment, the minute openings in the direction of movement are conical in shape tapering outwardly in the direction of movement. In an alternative embodiment, the minute openings in the direction of movement are hourglass in shape.

A method for filtering machine tool coolant contaminants including the elongate contaminates from the industrial liquid includes the steps of interposing a foraminous filter surface perforated with a plurality of minute openings configured to pass the fluid while preventing passage of contaminant into a flow of the contaminated industrial liquid.

In an alternative embodiment, the filter apparatus includes a horizontally disposed immersible disc filter assembly. The assembly includes a hollow rotatable mandrel of predetermined cross-sectional shape having perforations through which the machine tool coolant is movable. The disc filter assembly also includes a plurality of hollow disc filter elements having a filter portion for receiving machine tool coolant into the hollow of the filter element. Each filter element has a hub portion of a cross-sectional shape configured to key to the predetermined cross-sectional shape of the mandrel so that the disc filter elements move in driven relationship with the mandrel. The filter elements are spaced along the hollow mandrel and located thereon to place the hollow of each filter element in machine tool coolant fluid communication with the hollow of the mandrel through at least one of the perforations.

A plurality of spacer elements relatively rotatably mounted on the mandrel is mounted between each pair of filter elements for spacing the filter elements and for providing a bearing surface for supporting the doctor means for rotation relative to the mandrel.

Each disc filter element includes a frame element, a filter backing element, a filter element and a means for retaining in sandwich fashion the frame, filter backing element and filter elements.

Preferably, the retainer is an endless elastomeric member urgingly fittable about the frame filter backing element and filter elements for securing the same together to allow simple replacement of the filter elements.

BRIEF DESCRIPTION OF THE DRAWINGS

FIG. 4 is a perspective partial view of a disc filter assembly substitutable for the drum filter assembly in the filter system of FIG. 1;

FIG. 5 is a sectional plan view taken along lines 5—5 in FIG. 4 of a disc filter element of the disc filter assembly illustrating communication of the machine tool coolant;

FIG. 6 is an exploded planar view taken along arrow 6 in FIGS. 3 and 5 illustrating a section of a first embodiment of the foraminous non-reticulated surface of the filters of the present invention;

FIG. 7 is a cross-sectional view taken along lines 7—7 in FIG. 6;

FIG. 8 is an exploded planar view like FIG. 6 illustrating a second embodiment of the foraminous non-reticulated surface of the filters of the present invention;

FIG. 9 is a cross-sectional view taken along lines 9—9 in FIG. 8;

FIG. 10 is a perspective view of an immersible disc filter apparatus constructed in accordance with the present invention illustrating a hollow mandrel and a plurality of disc filter elements removably mounted thereon;

FIG. 11 is an exploded perspective view of a disc filter element illustrating a frame, filter backing elements, filter elements and retainer;

FIG. 12 is a partial elevational view of an elastomeric endless retainer;

FIG. 13 is a sectioned view of the endless elastomeric retainer taken along lines 13—13 in FIG. 12;

FIG. 14 is an elevational view of a spacer element for spacing the disc filter elements on the hollow mandrel;

FIG. 15 is a partial sectional view of the spacer element of FIG. 12 taken along lines 15—15 in FIG. 14;

FIG. 16 is a side view of a scraper blade assembly mountable on the spacer element; and FIG. 17 is a plan view of the scraper blade assembly of FIG. 16.

BEST MODE FOR CARRYING OUT THE INVENTION

Figure 1:
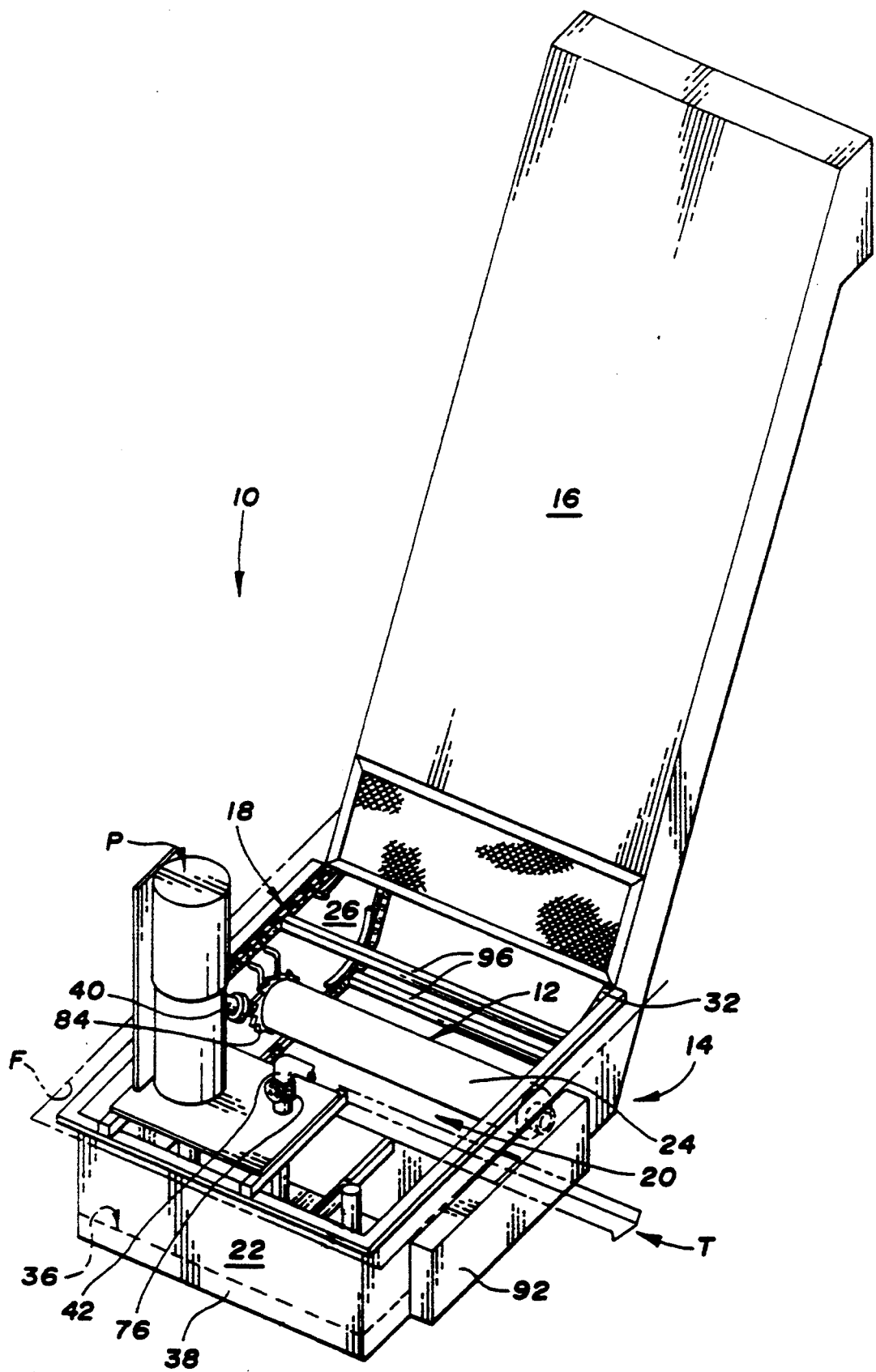
FIG. 1 is a perspective view of a filter system including a removable drum filter having a non-reticulated foraminous surface constructed in accordance with the present invention.

With reference to FIG. 1 of the drawings, a filter apparatus for filtering machine tool coolant constructed in accordance with the present invention is generally indicated by reference numeral 10. As is hereinafter more fully described, apparatus 10 includes a filter assembly 12 which is easier to keep clean and that prevents machining chips, particulate as well as elongate contaminants in the coolant from being recirculated to the machine tools.

Referring again to FIG. 1, a settling tank 14 is set into a pit disposed below the floor level or elevation F in an industrial environment. Tank 14 is generally rectilinear in configuration and has a sloping end wall or ramp 16 for use in conjunction with a dragout conveyor 18. Tank 14 is comprised of two discrete compartments; a dirty or contaminated coolant compartment, designated 20, for receiving dirty coolant from trough T in communication with the machine tools, also not shown; and a clean coolant compartment 22 for receiving clean filtered coolant from tank 14.

Figure 3:
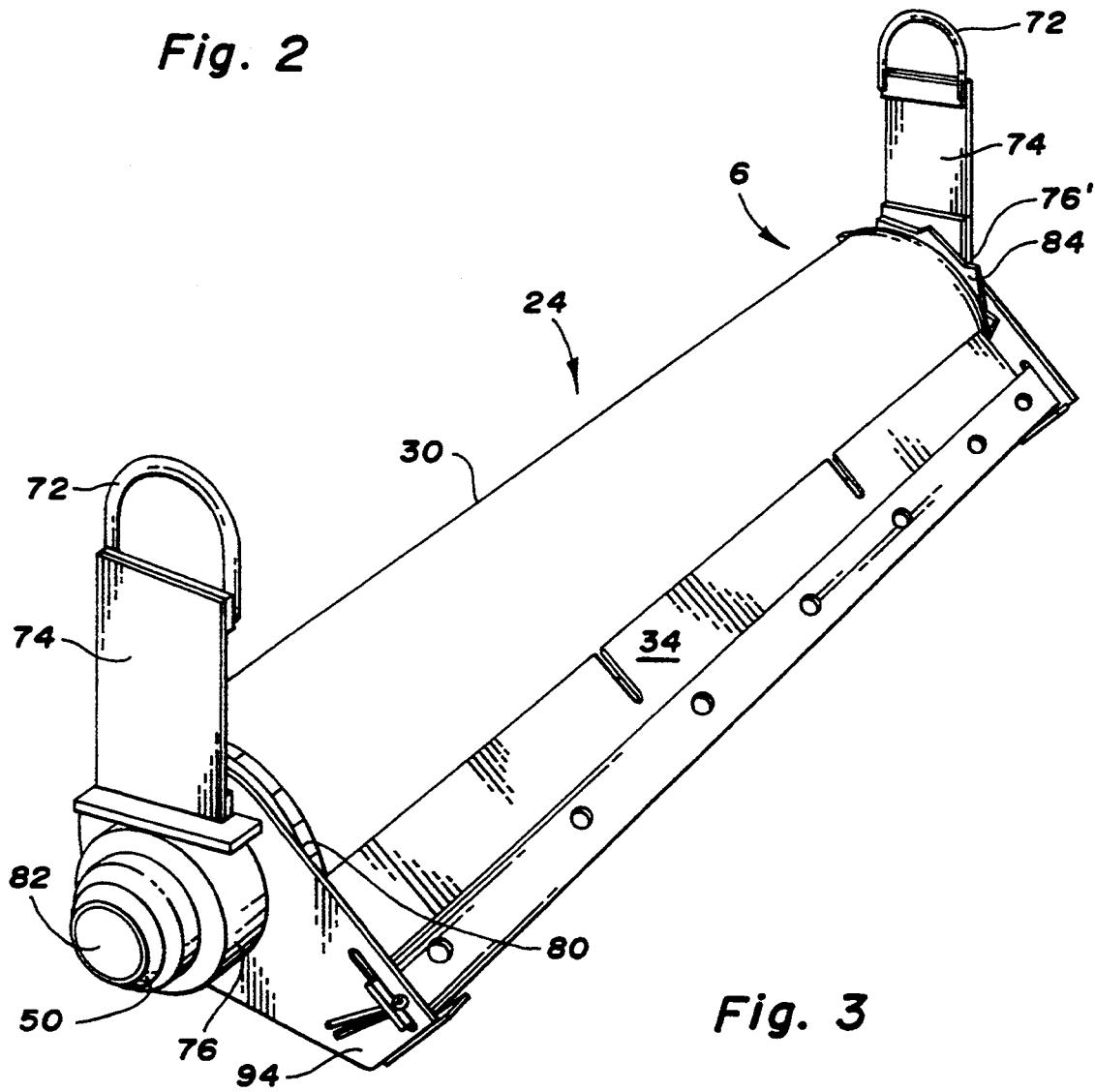
FIG. 3 is a perspective view of the drum filter assembly.

Within dirty coolant compartment 20, there is provided a horizontally disposed drum filter assembly 24 between two parallel sides 26,28 of tank 14 for filtering the dirty coolant whereby clean coolant filtrate may be supplied machine tools as explained hereinafter. Preferably, drum filter 24, as best seen in FIG. 3, has a foraminous surface 30 comprised of a non-reticulated metal screen having minute openings 32, as best seen in FIGS. 6-9, and a smooth planar surface. Minute openings 32 are preferably in the range of between 50 and 250 microns in diameter and most preferably 120 microns. In a first configuration, shown in FIGS. 8 and 9, minute openings 32 in the direction of coolant movement are conical, tapering outwardly. In a second configuration, shown in FIGS. 6 and 7, minute openings 32 in the direction of coolant movement are hourglass in shape.

During operation of the filter apparatus 10, drum filter 24 collects a filter cake composed of machining chips (particulate including elongate contaminants) from machine tool operations about its surface 30. Coolant is moved through the filter cake and surface 30 of the drum filter 24 into the interior of the drum. More particularly, a suction is drawn on the inside of drum 24 by pump P. Coolant in dirty filter tank compartment 20 thus passes through the filter cake and drum, and cleaned or filtered coolant is supplied by the pump P to the machine tools.

Dragout conveyor 18 is conventional in construction and serves to remove both the solids settled out from the coolant and the filter cake removed from the filter drum 24 by a doctor blade 34 shown in FIG. 3, both of which settle to the bottom of tank compartment 20. Doctor blade 34 comprises a non-abrasive material, preferably a flexible plastic material, having a leading edge flexed to contact the surface 30 in a parallel relationship whereby the surface is easily cleaned. The solids removed from the bottom of the tank compartment 20 by conveyor 18 are deposited in a suitable receptacle, not shown, at the end of the conveyor. For present purposes, it will be appreciated that clean coolant is supplied from the interior of the one or more filter drums 24 to the machine tools by operation of the pump P hereof. Clean coolant compartment 22 includes an elevated or false floor 36 above the lower tank wall bottom and which defines a lower chamber 38 for receiving clean coolant from the suction side of filter drum via conduit 40.

Disposed in clean compartment 22 is a main outlet conduit 42 for connection with the machine tools. Thus, clean coolant is supplied the machine tools from the suction side of filter 24 by way of chamber 38, pump P and outlet conduit 42. The purpose of clean coolant compartment 22 is to provide a reservoir of clean coolant which can be supplied the machine tools when the drum filter 24 is indexed for cleaning. Thus, a valve, not shown, is opened affording communication between the clean coolant in chamber 38 and the clean coolant in the remainder of clean coolant compartment 22 above floor 36. In this manner, pump P suction is applied to the clean coolant in compartment 22 to supply coolant to the machine tools. The suction is also removed with respect to the inside of the drum filter assembly 24 to facilitate cleaning filter cake from the outside surface of the drum. Upon closing this valve, pump suction to the filter drum is reestabilshed, as will become clear from the ensuing description.

Figure 2:
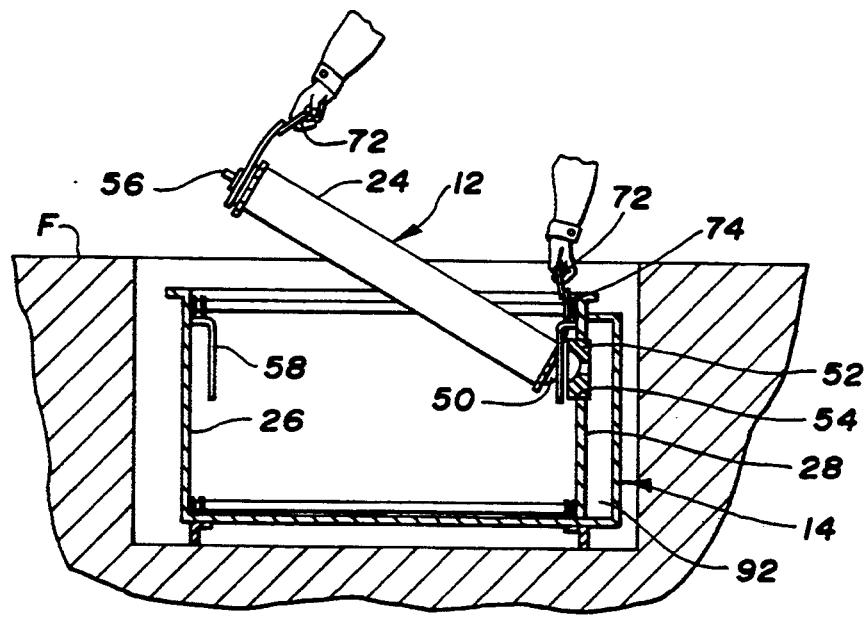
FIG. 2 is a sectional partial plan view of the filter system of FIG. 1 illustrating the removability of a drum filter assembly.

Referring now to FIGS. 2 and 3, drum filter 24 is shown to have axial extensions at each end, one end comprising a ball duct joint 50, the socket 52 of which is placed in an aperture 54 in the side wall 28 of tank 14; and the other end of which filter 24 is provided with a spring axially outwardly pressed cap or pin 56 which in the position shown has an over-all length greater than the distance between the wall 26 and the base of the socket 52 as shown. Thus, when the filter assembly 24 has its ball duct end 50 placed into the socket 52 guided by the U-shaped bracket 58, the other end may have its pin 56 pressed against the wall 26 of the tank 14 so that a resilient means, which may be a compression spring inside an axially aligned sleeve in the drum filter 24, will urge the whole assembly 24 and its ball duct 50 into sealing engagement with the socket 52 anchored in the opposite parallel wall 28 of the tank 14. Since it is not possible to lift the ball duct 50 vertically out of its socket 52 in order to remove the drum filter assembly 24, the opposite end with pin 56 must be lifted first as shown in FIG. 2 so that ample space above the tank 14 is had to remove the ball duct 50 from socket duct 52.

Similarly, in installing the drum filter assembly 24, the same procedure must be followed. If desired, the ends of the drum filter assembly 24 may be provided with lifting handles 72 as shown in FIGS. 2 and 3, in which event it is necessary that the connections 74 between each handle 72 and the non-rotatable bearing ends 76 and 76' should be inwardly directed or flexible plates to permit clearance from the side walls 26 and 28 as shown particularly at the right end of the filter 24.

In a first arrangement of filter apparatus 10 shown in FIGS. 1-3, the filter assembly 12 is a drum filter assembly 24 having foraminous non-reticulated metal screen surface 30 providing the filtering. An end disc 80 is centrally apertured and may be integral through a hollow hub portion 82 with the ball duct 50. Another end disc 84 is also communicable with hollow hub portion 82 and may be peripherally serrated to form a ratchet wheel engageable by a drive means, not shown, for rotating the filter assembly 12 for cleaning.

In a second arrangement of filter apparatus 10, the drum filter assembly 24 shown in FIGS. 1 and 2 is replaced by disc filter assembly 24', shown partially in FIGS. 4 and 5. Filter assembly 24' is a disc filter assembly comprising a plurality of hollow disk filter elements 88 spaced along and in communication with hub portion 82 which can, in number, increase the filter surface area as compared to a drum filter of the same volume. Each disk filter element 88 includes the same foraminous surface 30 and an adapted doctor blade 34' for scraping the surface. As seen in FIG. 5, coolant is communicated through surface 30 of disk filter 88, whereby machining chips, particulate as well as elongated contaminants form a filter cake on the surface, and is passed through the hollow disc and into hub 82.

In either construction, clean liquid which passes through the surface 30 can flow unobstructedly out through the apertured disc 80 and hub 82, ball duct 50 and socket duct 52 into a suction duct 92 which may comprise a separate chamber on the outside of the wall 28 of the settling tank 12.

The stationary bearing means 76 and 76' are provided with radially outwardly extending flanged wing portions 94 for adjustably supporting the flexible plastic scraping or doctor blades 34,34' against the outer filter surface 30. The non-abrasive doctor blades 34,34' remove the fine solid particles that accumulate and form a filter cake on the foraminous non-reticulated surface 30 when the filter 24,24' is indexed at intervals by the drive means. During this operation, the suction in duct 92 is reduced to aid in allowing the removed particles to settle and be carried out by flights 96 of the conveyor.

FIGS. 10–15 illustrate in greater detail disc filter assembly 24'. Referring to FIG. 10, the immersible disc filter assembly 24' includes a hollow rotatable mandrel 100 of predetermined cross-sectional shape. Herein, the mandrel 100 is shown having a rectangular cross-sectional shape although other shapes are equally functionable. Hollow mandrel 100 also includes perforations 102 through which the machine tool coolant is movable. Disc filter assembly 24' includes a plurality of hollow disc filter elements 88'. Each filter element 88' has a filter portion 104 for receiving the machine tool coolant into the hollow of the filter element. Each filter element 88' also has a hub portion 106 of a cross-sectional shape configured to key to the predetermined cross-sectional shape of the mandrel 100. The keying feature of the disc filter elements 88' to the mandrel 100 provides a driven relationship of the disc filter element by the mandrel.

The filter elements 88' are spaced along the hollow mandrel 100 and are located on the mandrel to place the hollow of each filter element in machine tool coolant fluid communication with the hollow of the mandrel through at least one of the perforations 102.

A plurality of spacer elements 108 are mounted on the mandrel 100. Each spacer element 108 functions to space the filter elements 88' along the mandrel 100 and also to provide a bearing surface for supporting a scraper blade assembly for relative rotation with respect to the mandrel.

With reference to FIG. 11, each disc filter element 88' includes a frame element 110, a filter backing element 112, a filter element 114 and a retainer 116. The retainer 116 retains in sandwich fashion the frame 110, filter backing element 112 and filter element 114. Illustrated is a two-sided filter element 88' which maximizes filter surface area although the disc filter element can be made one-sided.

With further reference to FIG. 11, the retainer 116 is a rigid retaining ring fastenable about the periphery of the filter element and filter backing element to mount the same on the frame element 110.

With reference to FIGS. 12 and 13, a preferred retainer 116' is illustrated. Retainer 116' is an endless elastomeric member having inner and outer circumferential surfaces 118 and 120. The inner circumferential surface 118 is of a generally concave cross-sectional shape as illustrated in FIG. 13. The endless elastomeric retainer 116' allows the retainer to be stretched over the filter element 114 and filter backing element 112 and frame element 110 to bias the same together in urged engagement. This allows the filter element 114 to be changed quite quickly although use of a rigid retainer 116 as in FIG. 11, may sometimes be more appropriate.

Referring now to FIGS. 14 and 15, the spacer element 108 is a sleeve having inner and outer surfaces 122,124. The outer surface 124 of the sleeve includes a circumferential groove 126 to mount a bearing 128 on which the scraper blade assembly 130 is mounted. Spacer element 108 allows for relative rotation between the scraper blade assembly 130 and mandrel. For simplicity in construction, a steel band has been used as the bearing 128. However, many types of bearings are contemplated for use in the invention.

FIGS. 16 and 17 illustrate scraper blade assembly 130. Scraper blade assembly 130 includes an arm 132 mountable on bearing 128. In the construction illustrated, arm 132 is welded onto bearing 128. Arm 132 includes a mounting portion 134 for replaceably mounting a doctor blade 34' on the arm. As best seen in FIG. 17, mounting portion 134 is angled outwardly so that a doctor blade 34' mounted thereon strikes the surface of filter element 114 at an acute angle. As the mandrel 100 is rotated, the filter element 114 is likewise rotated into the leading edge of doctor blade 34' to scrape collected contaminant of filter element 114.

Each doctor blade 34' can be easily replaced on arm 132 such as by welding or fastening with a threaded fastener or riveting. Also, it can be appreciated that the material used for doctor blade 34' will be dependent on the industrial liquid filtered, nature of contaminant, speed of operation, etc. Although each scraper blade assembly 130 is illustrated with two doctor blades 34' for scraping adjacent surfaces of two side-by-side filter elements 114, only one doctor blade 34' is required at the outer ends of mandrel 100.

While the best mode for carrying out the invention has been described in detail, those familiar with the art to which this invention relates will recognize various alternative embodiments for practicing the invention as defined by the following claims.

What is claimed is:

1. An immersible disc filter assembly for filtering particulates from a fluid, the disc filter assembly comprising:
    a hollow rotatable mandrel of predetermined cross-sectional shape having perforations through which fluid is movable;
    a plurality of hollow disc filter elements having a filter portion for receiving fluid into the hollow of said filter element, each filter element being in driven relationship with the mandrel, said filter elements being spaced along the hollow mandrel and located thereon to place the hollow of each filter element in fluid communication with the hollow of said mandrel through at least one of said perforations;
    a plurality of spacer elements relatively rotatably mounted on said mandrel, one of said spacer elements being mounted between each pair of filter elements for spacing said filter elements; and
    means for scraping said disc filter elements to remove the particulates therefrom mounted on said spacer elements.

2. A disc filter assembly as in claim 1 wherein said spacer elements include sleeves having inner and outer surfaces.

3. A disc filter assembly as in claim 2 wherein said outer surface of said sleeve includes a circumferential groove and the means for scraping includes a scraper blade assembly having a bearing mounted in the groove allowing for relative rotation between the scraper blade assembly and the mandrel.

4. A disc filter assembly as in claim 3 wherein said bearing is a steel band.

5. An immersible disc filter assembly comprising:
    a hollow rotatable mandrel of predetermined cross-sectional shape having perforations through which machine tool coolant is movable;
    a plurality of hollow disc filter elements having a filter portion for receiving machine tool coolant into the hollow of said filter element, each filter element having a hub portion of a cross-sectional shape configured to key to the predetermined cross-sectional shape of the mandrel and in driven relationship therewith, said filter elements being spaced along the hollow mandrel and located thereon to place the hollow of each filter element in tool coolant fluid communication with the hollow of said mandrel through at least one of said perforations; each disc filter element including a frame element, a filter backing element, said filter portion and a means for retaining in sandwich fashion said frame element, filter backing element and filter portion;
    means for scraping the surface of said filter elements; and
    a plurality of spacer elements mounted on said mandrel, one of said spacer elements being mounted between each pair of filter elements for spacing said filter elements and said scraping means mounted on said spacer elements for allowing relative rotation between said scraping means and the filter elements.

* * * * *